United States Patent [19]
Endo et al.

[11] Patent Number: 6,033,813
[45] Date of Patent: Mar. 7, 2000

[54] METHOD OF MANUFACTURING COLOR FILTER

[75] Inventors: Hiroki Endo, Kanagawa; Yoshinori Uchida, Kagoshima, both of Japan

[73] Assignee: Sony Corporation, Japan

[21] Appl. No.: 09/096,573

[22] Filed: Jun. 12, 1998

[30] Foreign Application Priority Data

Jun. 20, 1997 [JP] Japan .................. P09-164456

[51] Int. Cl.[7] ............................. G02B 5/20; G02F 1/1335
[52] U.S. Cl. ............................. 430/7; 430/311; 430/328; 430/330
[58] Field of Search .................. 430/7, 311, 312, 430/326, 328, 330

[56] References Cited

U.S. PATENT DOCUMENTS 4,808,501   2/1989   Chiulli ........................................ 430/7

FOREIGN PATENT DOCUMENTS

| 7-111485 | 5/1990 | Japan . |
| 6-035182 | 2/1994 | Japan . |
| 6-035183 | 2/1994 | Japan . |
| 6-194826 | 7/1994 | Japan . |

OTHER PUBLICATIONS

English language translation of JP 6–194826, "Positive Resist Composition and Production of Color Filter Using the Composition", Hishiro et al., Jul. 1994.
English language translation of JP 6–035183, "Positive Type Resist Composition and Production of Color Filter Using the Same", Hishiro et al., Feb. 1994.

*Primary Examiner*—John A. McPherson
*Attorney, Agent, or Firm*—Rader, Fishman & Grauer; Ronald P. Kananen

[57] ABSTRACT

Disclosed is a method of manufacturing a color filter using a photoresist containing a dye in a large amount, which is capable of enhancing optical and mechanical characteristics of the color filter and improving the workability. The method includes the steps of: coating a surface of a base with a positive type photoresist containing a dye in an amount of 10 to 50 wt %, and processing the photoresist by pattern-exposure and development to form a dye containing photoresist layer having a specific pattern; and hardening the dye containing photoresist layer to form specific color filter elements; wherein the hardening step includes a step of heating the photoresist layer while letting the photoresist layer be irradiated with ultraviolet light.

14 Claims, 4 Drawing Sheets

METHOD OF MANUFACTURING COLOR FILTER

BACKGROUND OF THE INVENTION

The present invention relates to a method of manufacturing a color filter suitable for solid-state image sensing devices, liquid crystal displays and the like.

Electronic devices such as CCD (Charge Coupled Device) type color solid-state image sensing devices and color liquid crystal displays each have on its front face a color filter in which filter elements of red, green and blue or cyan, yellow, and magenta are disposed in a specific array, for example, a specific stripe or mosaic pattern.

An example of a CCD type color solid-state image sensing device will be described with reference to FIG. 1 in which a light receiving portion of the device is schematically shown in cross-section. In this example, a p-type first well region 2 is formed on a principal face side of an n-type semiconductor substrate 1, and an n-type doped region 3 for forming a photoelectric transfer element such as a photodiode is formed on a portion of the well region 2 in which the light receiving portion is to be formed and a p-type highly doped positive charge storage region 4 is formed on a surface of the doped region 3, to form a light receiving portion 5. A number of the light receiving portions 5 are formed on the semiconductor substrate 1 in such a manner as to be arranged along the horizontal and vertical directions. A common vertical shift register having a CCD configuration is formed adjacently to a sequence of those of the light receiving portions 5 arranged in the vertical direction. The vertical shift register is composed of an n-type transfer region 8 formed on a p-type second well region 7 and a transfer electrode 10 formed on the transfer region 8 through an insulating layer 9 made from $SiO_2$ or the like. A plural sets of the transfer electrodes 10, insulated from each other in the vertical direction, are arranged. When a clock voltage is applied between the transfer electrodes 10 of each set, the corresponding light receiving portion 5 generates charges in correspondence with the received light amount. The charges thus generated from the light receiving portions 5 are fetched therefrom and are sequentially transferred in the vertical direction.

A p-type highly doped channel stop region 14 is formed on the semiconductor substrate 1 at such a portion as not to allow reception and transfer of charges.

A light shielding film 11 formed of an Al layer or the like, which has a light receiving window 11w located directly over the light receiving portion 5, is formed substantially over the entire upper surface of the solid-stage image sensing device.

A protective film 12 made from a light transmissive material such as $SiO_2$ or SiN is formed over the entire surface of the light shielding film 11, and a color filter 13 is formed on the protective film 12.

Figure 2:
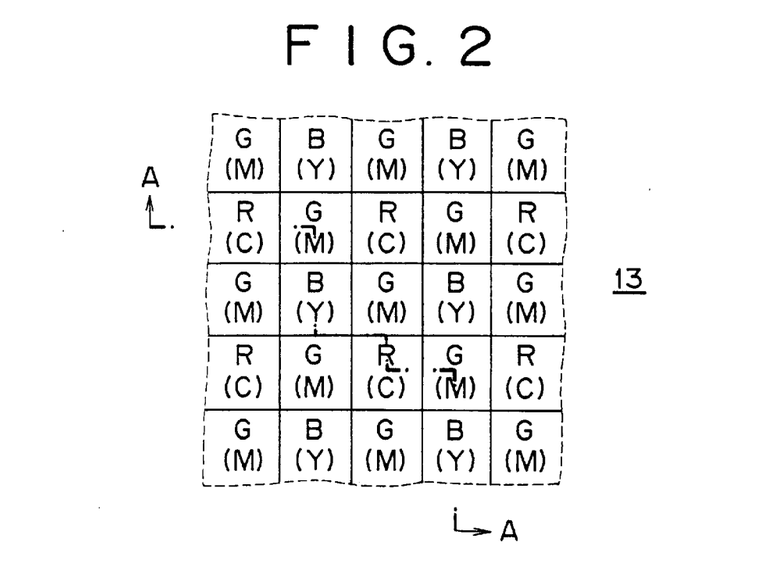
FIG. 2 is a diagram showing an arrangement pattern of color filter elements of the color filter manufactured by the method of the present invention.

FIG. 2 shows an example of an arrangement pattern of filter elements of the color filter 13. In this example, red filter elements R, green filter elements G and blue filter elements B, or cyan filter elements C, magenta filter elements M and yellow filter elements Y are arranged over the corresponding light receiving portions 5 in a mosaic pattern.

Various methods of manufacturing such a color filter have been proposed. In particular, a method of using as color filter elements a pattern formed of a dye containing positive photoresist (type in which an exposed portion is desirably soluble in a developer) is suitable for manufacturing a color filter having a fine pattern.

In this method, a base on which a color filter is to be formed, for example, an upper surface of the above-described solid-state image sensing device is coated with a positive type photoresist containing a dye of a first color, for example, red. The photoresist is subjected to pattern-exposure by exposing the entire surface thereof except for portions for forming desired red filter elements R. The exposed portions are then removed by development, to pattern the photoresist. A photosensitive agent contained in the photoresist is bleached, and the photoresist is heated for hardening, to form red filter elements R. Subsequently, the entire surface of the base containing upper surfaces of the red filter elements R is coated with a positive type photoresist containing a dye of another color, for example, green. Thereafter, the above-described procedure is repeated, to form green filter elements G. Similarly, blue filter elements B are formed using a positive type photoresist containing a blue dye in accordance with the above-described procedure. In this manner, a color filter in which the filter elements R, G and B are arranged as shown in FIG. 2 is obtained.

In the method of manufacturing a color filter, in which a pattern of a photoresist containing a dye of each color is directly used as filter elements of the color, a base is sequentially coated with a plurality of photoresists containing dyes of desired colors. In this case, when a previously formed photoresist layer patterned into filter elements is coated with a photoresist containing another dye, the dye is possibly permeated in the previously formed photoresist layer, resulting in color mixture. To avoid occurrence of such a color mixture, the patterned photoresist must be sufficiently hardened to enhance a solvent resistance for preventing contamination of another dye. In general, a photoresist layer is hardened by heating it at a temperature in a range of 120° C. to 150° C.

On the other hand, with respect to the method of manufacturing a color filter in which a pattern of a photoresist containing a dye is directly used as filter elements, there has been proposed a method of manufacturing a color filter in Japanese Patent Publication No. Hei 7-111485, in which a positive type photoresist containing a dye in a large amount of 10 to 50% is used for obtaining excellent color filter characteristics.

Incidentally, a patterned photoresist containing a large amount of dye, which is obtained by the above-described general hardening treatment carried out by heating the photoresist at about 150° C., fails to exhibit a sufficient solvent resistance, because the added dye has a relatively small molecular weight. As a result, a dye of another color having a small molecular weight is liable to be mixed in the previously hardened photoresist, leading to reduction in color purity. To avoid such an inconvenience, it may be considered to-increase the hardening temperature at a value more than 150° C.; however, in this case, a photoresist is deformed. In particular, a photoresist containing a dye in a large amount tends to be significantly deformed because the added dye is generally lower in melting point than a binder resin.

The deformation of a photoresist, particularly, having a fine pattern, causes problems in degrading optical and mechanical characteristics, thereby reducing the reliability and increasing the incidence of defective.

SUMMARY OF THE INVENTION

An object of the present invention is to provide a method of manufacturing a color filter using a photoresist containing a dye in a large amount, which is capable of enhancing optical and mechanical characteristics of the color filter and improving the workability To achieve the above object, according to the present invention, there is provided a method of manufacturing a color filter, including the steps of: coating a surface of a base with a positive type photoresist containing a dye in an amount (dry weight) of 10 to 50 wt %, and processing the photoresist by pattern-exposure and development to form a dye containing photoresist layer having a specific pattern; and hardening the dye containing photoresist layer to form specific color filter elements; wherein the hardening step includes a step of heating the photoresist layer while letting the photoresist layer be irradiated with ultraviolet light.

In the present invention, as described above, a photoresist patterned into a specific pattern is irradiated with ultraviolet light for bleaching a photosensitive agent contained in the photoresist and is heated for hardening in a state in which the ultraviolet irradiation is continued. With this configuration, not only bleaching but also hardening can be desirably performed. The photoresist pattern can be hardened with less deformation, to be thus prevented from being peeled due to deformation and reduced in terms of sharpness. Using such a photoresist pattern, a color filter element having a high reliability can be formed at a high yield. As a result, a color filter excellent in filter characteristics can be manufactured using color filter elements formed of patterned photoresists each containing a dye in a large amount.

According to the present invention, a photoresist is desirably hardened, and accordingly, when the photoresist thus hardened to form a color filter element is coated with a photoresist containing a dye of another color for forming another color filter element, the dye is effectively prevented from being permeated in the previously formed color filter element. That is to say, it is possible to avoid occurrence of the color mixture. As a result, according to the present invention, a color filter excellent in optical and mechanical characteristics can be manufactured at a high yield.

As described above, according to the present invention, since heating for hardening is performed simultaneously with ultraviolet irradiation for bleaching, the hardening is promoted by ultraviolet irradiation, and therefore, the hardening is positively performed as compared with the case where the hardening is performed only by heating.

DETAILED DESCRIPTION OF THE PREFERRED EMBODIMENT

Hereinafter, one embodiment of a method of manufacturing a color filter according to the present invention will be described with reference to the accompanying drawings.

In this embodiment, a filter element of each color is formed using a positive type photoresist containing a dye in a large amount (dry weight) of 10 to 50 wt %.

Figure 3:
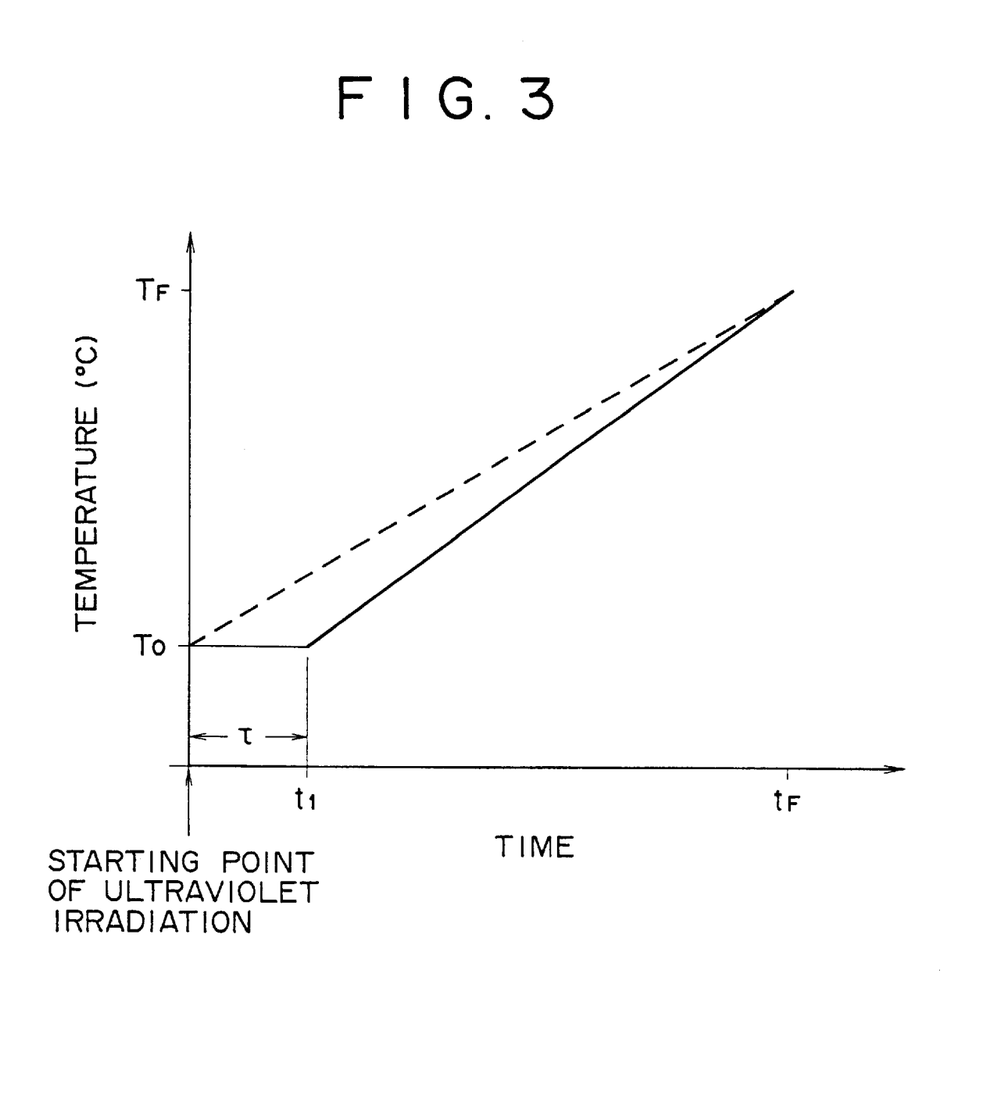
FIG. 3 is a graph showing a temperature program used for the manufacturing method of the present invention.

A surface of a base on which a color filter is to be formed is coated with the above photoresist. Here, examples of the bases may include a glass substrate, a solid-state image sensing device, and a liquid crystal display. The photoresist is processed by pattern-exposure and development to form a dye containing photoresist layer having a specific pattern. Thereafter, as a feature of the present invention, the photoresist layer is irradiated with ultraviolet light containing a light component having a wavelength of 320 nm or less for bleaching, and is heated for hardening in a state in which ultraviolet irradiation is continued. FIG. 3 shows a relationship between ultraviolet irradiation and heating. For example, as indicated by a solid line in FIG. 3, ultraviolet irradiation is started in a state in which the base is heated at a temperature $T_0$, and in a state in which the ultraviolet irradiation is continued, heating is started after an elapse of a time $\tau$, that is, at a time point $t_1$, and is continued until the temperature of the photoresist rises over a specific value allowing the photoresist to be sufficiently hardened. Alternatively, as indicated by a broken line in FIG. 3, ultraviolet irradiation is started in the state in which the base is heated at the temperature $T_0$, and simultaneously heating is started and is then continued together with the ultraviolet irradiation until the temperature of the photoresist rises over a specific value allowing the photoresist to be sufficiently hardened.

According to the present invention, a quantity of ultraviolet irradiation is selected at a value in a range of 20 J/cm² or less.

The start temperature $T_0$ in heating of a photoresist layer is in a range of 60 to 140° C., and the finish temperature $T_F$ in heating of a photoresist layer is in a range of 160 to 220° C.

An average temperature rising rate in heating of a photoresist layer is in a range of 1.5° C./sec or less.

The heating is preferably performed in an inert atmosphere, for example, in nitrogen ($N_2$) for ensuring the heating effect for a short period of time and suppressing coloring of a photoresist material due to oxidation.

The reason why the content of a dye in a photoresist is selected in a range of 10 to 50 wt % is as follows: namely, if less than 10 wt %, the filtering effect of a filter element finally formed becomes insufficient, and if more than 50 wt %, the adhesiveness of the photoresist to a base and the sharpness of patterning are possibly deteriorated.

The reason for use of ultraviolet light containing a light component having a wavelength of 320 nm or less is to desirably promote hardening of a photoresist.

Figure 1:
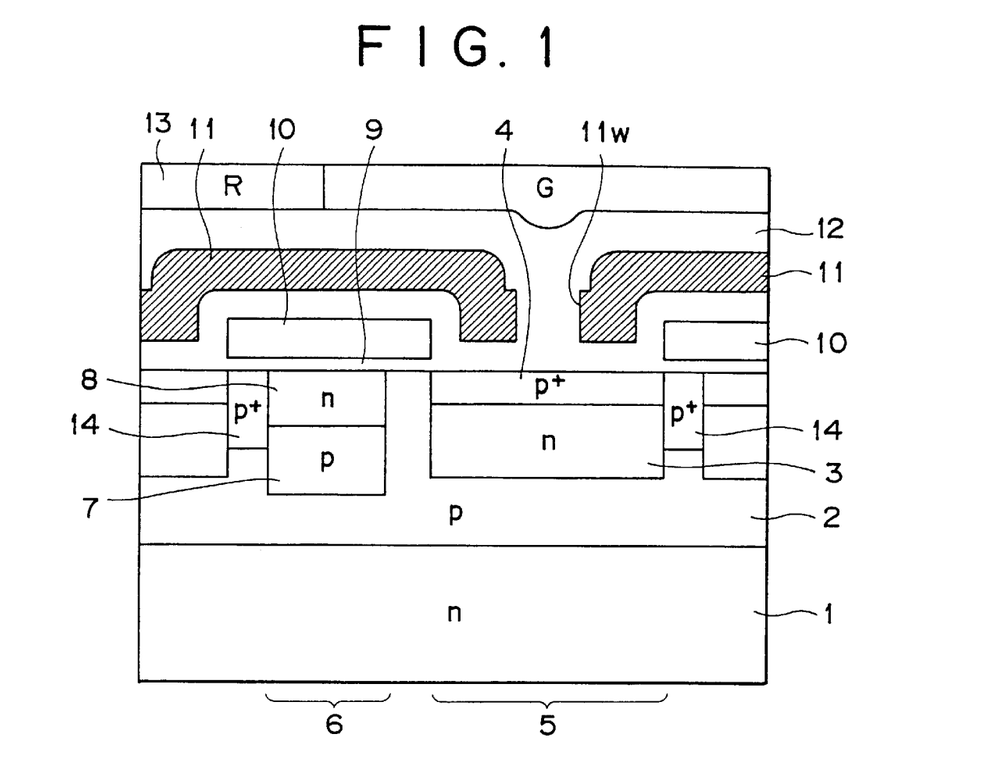
FIG. 1 is a schematic sectional view of an essential portion of one example of a solid-state image sensing device using a color filter manufactured by a method of the present invention.

The present invention can be applied to a method of manufacturing the color filter 13 arranged over the light receiving portions 5 of the CCD type solid-state image sensing device shown in FIG. 1, more specifically, the color filter 13 in which as shown in FIG. 2, the red filter elements R, green filter elements G and blue filter elements B are arranged over the corresponding light receiving portions 5 in a mosaic pattern.

Examples of the solid-state image sensing devices to which the present invention can be applied may include a frame transfer type, interline transfer type and frame interline transfer type.

In the solid-state image sensing device shown in FIG. 1, as described above, a p-type first well region 2 is formed on a principal face side of an n-type semiconductor substrate 1, and an n-type doped region 3 for forming a photoelectric transfer element, such as a photodiode is formed on a portion of the well region 2 in which the light receiving portion is to be formed and a p-type highly doped positive charge storage region 4 is formed on a surface of the doped region 3, to form a light receiving portion 5. A number of the light receiving portions 5 are formed on the semiconductor substrate 1 in such a manner as to be arranged along the horizontal and vertical directions. A common vertical shift register having a CCD configuration is formed adjacent to a sequence of the light receiving portions 5 arranged in the vertical direction. The vertical shift register is composed of an n-type transfer region 8 formed on a p-type second well region 7 and a transfer electrode 10 formed on the transfer region 8 through an insulating layer 9 made from $SiO_2$ or the like. A plural sets of the transfer electrodes 10, insulated from each other in the vertical direction, are arranged. When a clock voltage is applied between the transfer electrodes 10 of each set, the corresponding light receiving portion 5 generates charges in correspondence with the received light amount. The charges thus generated from the light receiving portions 5 are fetched therefrom and are sequentially transferred in the vertical direction.

A p-type highly doped channel stop region 14 is formed on the semiconductor substrate 1 at such a portion to prevent and transfer of charges.

A light shielding film 11 formed of an Al layer or the like, which has a light receiving window 11w located directly over the light receiving portion 5, is formed substantially over the entire upper surface of the solid-stage image sensing device.

A protective film 12 made from a light transmissive material such as $SiO_2$ or SiN is formed over the entire surface of the light shielding film 11, and a color filter 13 is formed on the protective film 12.

Figure 4A:
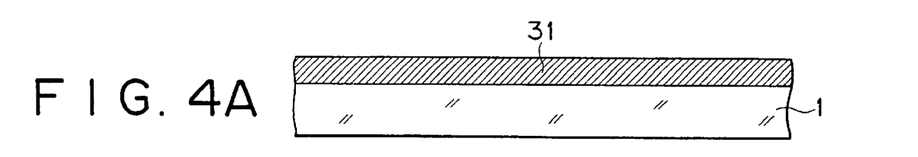
FIGS. 4A to 4G are sequential steps of one example of the manufacturing method of the present invention.

FIGS. 4A to 4G are schematic sectional views taken on line A—A of FIG. 2, showing sequential steps of forming the color filter 13. As shown in FIG. 4A, the entire surface of the base 1 on which the color filter 13 is to be formed, more specifically, the entire surface of the protective film 12 of the solid-state image sensing device shown in FIG. 1 is coated with a first dyed photoresist 31 containing a dye of a first color, for example, red in an amount of 10 to 50 wt %, by a known technique, for example, spin coating.

Figure 4B:
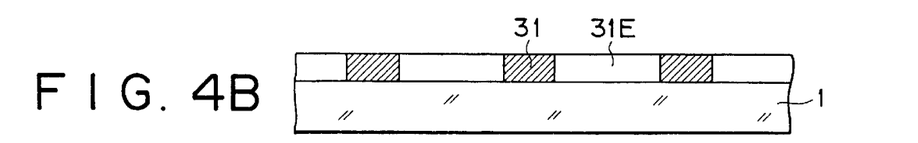

The first dye containing photoresist 31 is subjected to pattern-exposure. Specifically, the entire surface of the photoresist 31 except for portions for forming filter elements of the first color is subjected to stepper exposure using infrared rays (i-rays, wavelength: 365 nm), to form exposed portions 31E desirably soluble in a developer as shown in FIG. 4B.

Figure 4C:
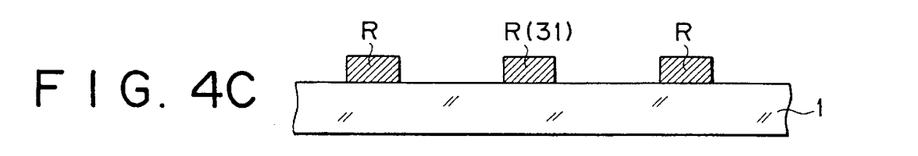

The photoresist 31 is developed to remove the exposed portions 31E as shown in FIG. 4C, so that red filter elements R selectively remain on the portions on which the filter elements of the first color, that is, red are to be formed.

The entire surface of the photoresist is then irradiated with ultraviolet light having a wavelength of 320 nm or less in a quantity of 20 $J/cm^2$ or less. The ultraviolet irradiation is performed mainly for bleaching a photosensitive agent contained in the photoresist.

The photoresist is heated simultaneously with the ultraviolet irradiation or after an elapse of a specific time τ since starting of the ultraviolet irradiation. The heating of the photoresist is continued together with the ultraviolet irradiation. The start temperature $T_0$ in the above heating is set at such a value as to hardly allow thermosetting of the photoresist, that is, in a range of 60 to 140° C. In other words, ultraviolet irradiation is started at the temperature $T_0$. An average temperature rising rate in the above heating is set at a value in a range of 1.5° C./sec or less, and the finish temperature in the above heating is set at a value in a range of 160 to 220° C.

With the above processing, the photosensitive agent contained in the filter elements R formed of the first photoresist is desirably bleached and simultaneously the filter elements R are desirably hardened. The filter elements R of the first color which is red in this embodiment are thus formed.

Figure 4D:
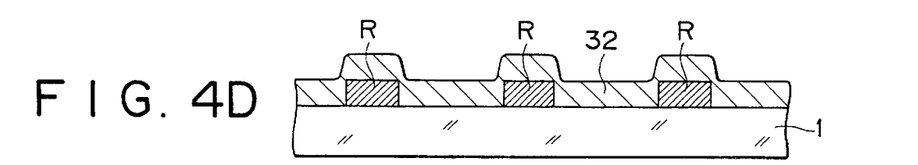

Next, as shown in FIG. 4D, the entire surface of the base containing upper surfaces of the filter elements R of the first color (red in this embodiment) is coated with a second dye containing photoresist 32 containing a dye of a second color, for example, green in an amount of 10 to 50 wt % by a known technology, for example, spin coating.

Figure 4E:
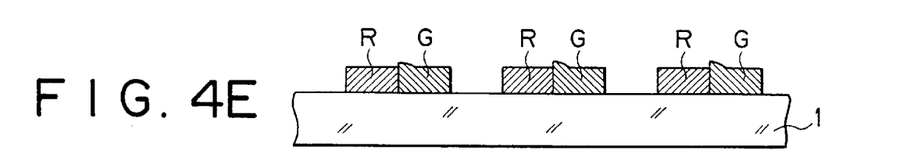

The second dye containing photoresist 32 is subjected to pattern-exposure. Specifically, the entire surface of the photoresist 32 except for portions for forming filter elements of the second color is subjected to stepper exposure using i-rays, to form exposed portions desirably soluble in a developer. The photoresist 32 is developed to remove the exposed portions as shown in FIG. 4E, so that green filter elements G selectively remain on the portions on which the filter elements of the second color, that is, red are to be formed.

The entire surface of the photoresist is then irradiated with ultraviolet light having a wavelength of 320 nm or less in a quantity of 20 $J/cm^2$ or less. The ultraviolet irradiation is performed mainly for bleaching a photosensitive agent contained in the photoresist. As described with reference to FIG. 3, the photoresist is heated simultaneously with the ultraviolet irradiation or after an elapse of a specific time τ since starting of the ultraviolet irradiation, that is, at the time point $t_1$. The heating of the photoresist is continued together with the ultraviolet irradiation. The start temperature $T_0$ in the above heating is set at such a value as to hardly allow thermosetting of the photoresist, that is, in a range of 60 to 140° C. In other words, ultraviolet irradiation is started at the temperature $T_0$. An average temperature rising rate in the above heating is set at a value in a range of 1.5° C./sec or less, and the finish temperature in the above heating is set at a value in a range of 160 to 220° C.

With the above processing, the photosensitive agent contained in the filter elements G of the second photoresist is desirably bleached and simultaneously the filter elements R are desirably hardened.

Figure 4F:
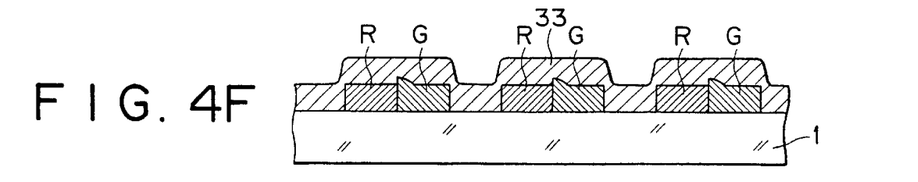

Next, as shown in FIG. 4F, the entire surface of the base 1 containing upper surfaces of the first and second filter elements R and G of the first and second colors which are red and green in this embodiment, is coated with a third dye containing photoresist 33 containing a dye of a third color, for example, blue in an amount of 10 to 50 wt % by a known technology, for example, spin coating.

Figure 4G:
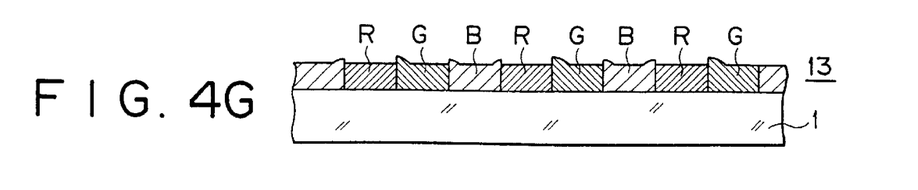

The third dye containing photoresist 33 is subjected to pattern-exposure. Specifically, the entire surface of the photoresist 33 except for portions for forming filter elements of the third color is subjected to stepper exposure using i-rays, to form exposed portions desirably soluble in a developer. The photoresist 33 is developed to remove the exposed portions as shown in FIG. 4G, so that blue filter elements B selectively remain on the portions on which the filter elements of the third color, that is, blue are to be formed.

The entire surface of the photoresist is then irradiated with ultraviolet light having a wavelength of 320 nm or less in a quantity of 20 J/cm² or less. The ultraviolet irradiation is performed mainly for bleaching a photosensitive agent contained in the photoresist. As described above, the photoresist is heated simultaneously with the ultraviolet irradiation or after an elapse of a specific time τ since starting of the ultraviolet irradiation. The heating of the photoresist is continued together with the ultraviolet irradiation. The start temperature $T_0$ in the heating process is set at such a value as to minimize thermosetting of the photoresist, that is, in a range of 60 to 140° C. In other words, ultraviolet irradiation is started at the temperature $T_0$. An average temperature rising rate in the above heating is set at a value in a range of 1.5° C./sec or less, and the finish temperature in the above heating is set at a value in a range of 160 to 220° C.

With the above processing, the photosensitive agent contained in the filter elements B of the third photoresist is desirably bleached and simultaneously the filter elements B are desirably hardened.

A color filter 13 is thus formed in which the filter elements R, G and B of the first, second and third colors which are red, green and blue respectively in this embodiment are arranged in a specific pattern.

The present invention will be more clearly understood with reference to the following example:

[Example 1]

In this example, a color filter composed of color filter elements of magenta, yellow and cyan is formed on a surface of a Si wafer (diagonal length: 5 inch) of a solid-state image sensing device, more specifically, formed on a protective film made from SiN on the Si wafer.

First, a surface of a protective film made from an inorganic material formed on a Si base of a solid-state image sensing device, that is, a surface on which a color filter is to be formed was subjected to hydrophobic treatment using HMDS (hexamethyl disilazane) to improve adhesion with a photoresist for forming each color filter element.

Meanwhile, there were prepared photoresists containing first, second, and third dyes having the following compositions.

(first dye containing photoresist)

novolac based photoresist: HPR-204ES-Z (23P) (produced by Fiji Hunt Electronics Technology Kabushiki Kaisha)
        100 parts by weight     auxiliary solvent: N,N dimethyl formamide
        20 parts by weight     dye: magenta (see the following chemical equation 1)
        8 parts by weight     thermosetting agent: hexamethoxymethylol melamine
        1 part by weight (second dye containing photoresist)

novolack based photoresist: HPR-204ES-Z (23P)
        100 parts by weight     auxiliary solvent: N,N dimethyl formamide
        20 parts by weight     dye: yellow (see the following chemical equation 2)
        8 parts by weight     thermosetting agent: hexamethoxymethylol melamine
        1 part by weight

(third dye containing photoresist)

novolack based photoresist: HPR-204ES-Z (23P)
        100 parts by weight     auxiliary solvent: N,N dimethyl formamide
        20 parts by weight dye: cyan (see the following chemical equation 3)
        8 parts by weight     thermosetting agent: hexamethoxymethylol melamine
        1 part by weight (equation 1)

(magenta dye)

(equation 2)

(yellow dye)

-continued (equation 3)

(cyan dye)

The surface of the base thus treated was coated with the first dye containing photoresist by spin coating.

The photoresist was pre-baked at 90° C. for one minute for removing the solvent.

The photoresist layer was subjected to pattern-exposure by stepper exposure using i-rays and developed with a 3% TMAH solution, to form a photoresist pattern for forming color filter elements of magenta.

The Si base was placed on a baking plate kept at 100° C., and simultaneously irradiated with ultraviolet light using a high pressure mercury lamp as a source of ultraviolet light. The ultraviolet light emitted from this source contains far infrared radiation having a wavelength of 300 nm or less. The intensity of the ultraviolet irradiation was set at 25 mW/cm$^2$.

After an elapse of 2 sec, in a state in which ultraviolet irradiation was continued, the baking plate was heated so that the temperature of the baking plate was set at 180° C. after an elapse of 120 sec. The quantity of ultraviolet irradiation was set at 3 J/cm$^2$, and the average temperature rising rate was set at 0.67° C./sec. In this way, the photoresist was bleached and hardened, to form color filter elements of magenta.

Next, the surface of the base was subjected to hydrophobic treatment again using the above-described HMDS solution.

The surface of the base thus treated was coated with the second dye containing photoresist by spin coating.

The photoresist was pre-baked at 90° C. for one minute for removing the solvent.

The photoresist layer was subjected to pattern-exposure by stepper exposure using i-rays and developed with the 3% TMAH solution, to form a photoresist pattern for forming color filter elements of yellow.

The Si base was placed on the baking plate kept at 100°0 C. and simultaneously irradiated with ultraviolet light using the high pressure mercury lamp as a source of ultraviolet light. The ultraviolet light emitted from this source contains far infrared radiation having a wavelength of 300 nm or less. The intensity of the ultraviolet irradiation was set at 25 mW/cm$^2$.

After 2 sec, in a state in which ultraviolet irradiation was continued, the baking plate was heated so that the temperature of the baking plate was set at 180° C. after an elapse of 120 sec. The quantity of ultraviolet irradiation was set at 3 J/cm$^2$, and the average temperature rising rate was set at 0.67° C./sec. In this way, the photoresist was bleached and hardened, to form color filter elements of yellow.

Next, the surface of the base was subjected to hydrophobic treatment, again using the above-described HMDS solution.

The surface of the base thus treated was coated with the third dye containing photoresist by spin coating.

The photoresist was pre-baked at 90° C. for one minute for removing the solvent.

The photoresist layer was subjected to pattern-exposure by stepper exposure using i-rays and developed with the 3% TMAH solution, to form a photoresist pattern for forming color filter elements of cyan.

The Si base was placed on the baking plate kept at 100° C. and simultaneously irradiated with ultraviolet light using the high pressure mercury lamp as a source of ultraviolet light. The ultraviolet light emitted from this source contains far infrared radiation having a wavelength of 300 nm or less. The intensity of the ultraviolet irradiation was set at 25 mW/cm$^2$.

After an elapse of 2 sec, in a state in which ultraviolet irradiation was continued, the baking plate was heated so that the temperature of the baking plate was set at 180° C. after an elapse of 120 sec. The quantity of ultraviolet irradiation was set at 3 J/cm$^2$, and the average temperature rising rate was set at 0.67° C./sec. In this way, the photoresist was bleached and hardened, to form color filter elements of cyan.

In this way, a color filter 13 in which the color filter elements of magenta, yellow and cyan were arranged was formed on the protective film 12 of the solid-state image sensing device.

While the color filter elements of magenta, yellow and cyan were formed in this order using the first, second and third dye containing photoresists in the above example 1, these color filter elements may be formed in any order other than the above one.

The reason why the quantity of ultraviolet irradiation was set at 20 J/cm$^2$ or less in the present invention is to suppress a change in absorbance of a color filter depending on ultraviolet irradiation.

Figure 5:
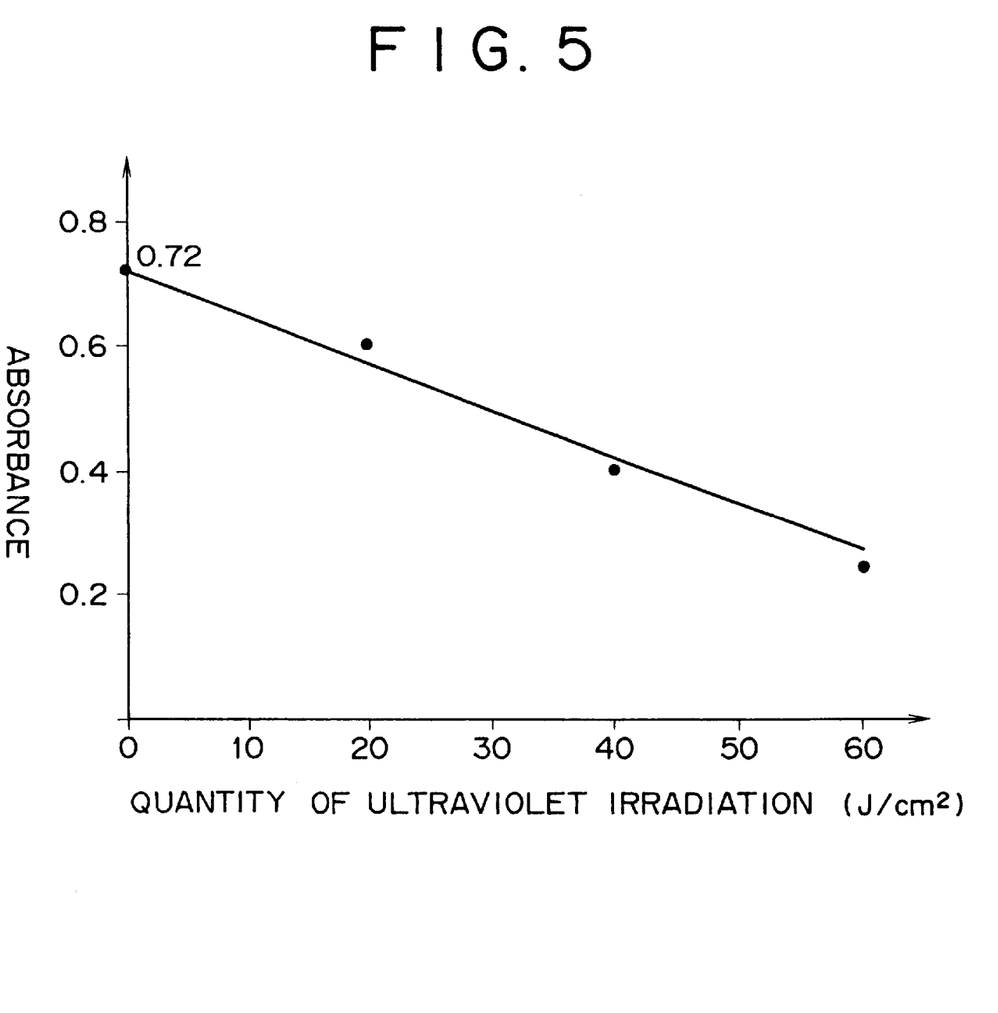
FIG. 5 is a graph showing a dependence of an absorbance of a photoresist on a quantity of ultraviolet irradiation, which is used for description of the manufacturing method of the present invention.

FIG. 5 shows a result of measuring an absorbance depending on a quantity of ultraviolet irradiation (J/cm$^2$) for a sample in which a glass substrate is coated with the above-described photoresist containing the first dye, that is, magenta whose absorbance is most variable depending on the quantity of ultraviolet irradiation. As shown in the figure, it is confirmed that the absorbance (initial value: 0.72) is largely changed with increasing quantity of ultraviolet irradiation; however, for the quantity of ultraviolet irradiation in a range of 20 J/cm$^2$ or less, the change in absorbance depending on the quantity of ultraviolet irradiation is suppressed at a value of 20% or less.

The reason why the start temperature $T_0$ in heating for hardening a photoresist is selected at a value in a range of 60 to 140° C. is as follows: namely, if less than 60° C., it takes a long time for temperature rising, leading to an industrial inconvenience in which the workability is reduced, and if more than 140° C., a photosensitive agent is significantly thermally-decomposed, obstructing the bleaching effect due to ultraviolet irradiation, with a result that the basic color, yellow of the photosensitive agent contained in the photoresist remains so that the optical characteristic of the color filter is degraded.

The reason why the average temperature rising rate is selected at a value in a range of 1.5° C./sec or less is to avoid deformation of a photoresist pattern containing a dye in a large amount of 10 to 50 wt % in co-operation with the above ultraviolet irradiation effect.

The reason why the finish temperature in heating for hardening a photoresist is selected at a value in a range of 160 to 22° C. is to harden the photoresist with certainly, and hence to form filter elements excellent in solvent resistance.

As described above, the color filter formed by the method of the present invention is advantageous in that color filter elements of each color exhibit an excellent sharpness, a high resistance against deformation, and a high color purity.

The reason for this is dependent on the following fact: namely, bleaching is effectively performed by ultraviolet irradiation before or at the beginning stage of heating for hardening a photoresist under the conditions determined as described above, and hardening of the photoresist is promoted by heating in a state in which the above ultraviolet irradiation is continued, and consequently, deformation of the photoresist can be prevented insofar as the temperature rising rate is lower than 1.5° C./sec which is a relatively high value, and also the finish temperature (maximum heating temperature) can be set at a value allowing the perfect hardening of the photoresist, that is, in a range of 160 to 220° C. to thereby avoid occurrence of the color mixture and ensure the stability of filter elements.

While a thermosetting agent is added in each of the photoresists containing the first, second and third dyes in the above example, it is not necessarily added. If such a thermosetting agent is not added, there is no fear of reduction in storage stability due to addition of the thermosetting agent.

The type of the solid-state image sensing device using the color filter of the present invention is not limited to that shown in FIG. 1. For example, the present invention can be applied to a solid-state image sensing device including a semiconductor a p-type semiconductor substrate 1. The present invention can be also applied not only to the surface charge transfer type but also a buried type CCD solid-state image sensing device. Further, the present invention can be applied to not only the solid-state image sensing device but also a liquid crystal display.

As described above, according to the method of manufacturing a color filter of the present invention, it is possible to stably form color filter elements of each color with an excellent sharpness, high resistance against deformation and high color purity, and hence to manufacture a color filter having excellent optical and mechanical characteristics and a high reliability at a high yield.

Since heating for hardening a photoresist is performed in such a manner as to be at least partially overlapped to ultraviolet irradiation mainly intended to be performed for bleaching, it is possible to shorten a working time and hence to improve the workability.

Since the heating rate for hardening can be set at a relatively low value and thereby heating can be performed on a baking plate as described in the example, it is possible to avoid an inconvenience caused in the case of oven heating in which it is difficult to perform ultraviolet irradiation simultaneously with heating. This enables continuation and simplification of works for manufacturing a color filter, resulting in the increased mass-productivity and the reduced cost.

What is claimed is:

1. A method of manufacturing a color filter, comprising the steps of:

coating a surface of a base with a positive photoresist containing a dye in an amount of 10 to 50 wt %, and processing the photoresist by pattern-exposure and development to form a dyed, patterned photoresist layer; and hardening the dye containing photoresist layer to form color filter elements, wherein said hardening step includes a step of heating the photoresist layer while irradiating the photoresist layer with ultraviolet light.

2. A method of manufacturing a color filter according to claim 1, wherein the ultraviolet light for ultraviolet irradiation to the photoresist layer contains a light component having a wavelength in a range of 320 nm or less.

3. A method of manufacturing a color filter according to claim 1, wherein a quantity of ultraviolet irradiation to the photoresist layer is in a range of 20 J/cm$^2$ or less.

4. A method of manufacturing a color filter according to claim 1, wherein a start temperature in the heating of the photoresist layer is in a range of 60 to 140° C.

5. A method of manufacturing a color filter according to claim 1, wherein a finish temperature in the heating of the photoresist layer is in a range of 160 to 220° C.

6. A method of manufacturing a color filter according to claim 1, wherein an average temperature rising rate in the heating of the photoresist layer is in a range of 1.5° C./sec or less.

7. A method of manufacturing a color filter according to claim 1, wherein the heating of the photoresist layer is performed in an inert atmosphere.

8. A method of manufacturing an electronic device, comprising the steps of:

forming an electronic element on a base;

coating a surface of the electronic element with a positive photoresist containing a dye in an amount of 10 to 50 wt %;

processing the photoresist by pattern-exposure and development to form a dyed, patterned photoresist layer; and hardening the dye containing photoresist layer to form specific color filter elements, wherein said hardening step includes a step of heating the photoresist layer while irradiating the photoresist layer with ultraviolet light.

9. A method of manufacturing an electronic device according to claim 8, wherein the ultraviolet light for ultraviolet irradiation to the photoresist layer contains a light component having a wavelength in a range of 320 nm or less.

10. A method of manufacturing an electronic device according to claim 8, wherein a quantity of ultraviolet irradiation to the photoresist layer is in a range of 20 J/cm$^2$ or less.

11. A method of manufacturing an electronic device according to claim 8, wherein a start temperature in the heating of the photoresist layer is in a range of 60 to 140° C.

12. A method of manufacturing an electronic device according to claim 8, wherein a finish temperature in the heating of the photoresist layer is in a range of 160 to 220° C.

13. A method of manufacturing an electronic device according to claim 8, wherein an average temperature rising rate in the heating of the photoresist layer is in a range of 1.5° C./sec or less.

14. A method of manufacturing an electronic device according to claim 8, wherein the heating of the photoresist layer is performed in an inert atmosphere.

* * * * *